US009590816B2

(12) United States Patent
Todd et al.

(10) Patent No.: US 9,590,816 B2
(45) Date of Patent: Mar. 7, 2017

(54) SYSTEM AND METHOD FOR CREATING MULTIPLE TRANSPORTATION STREAMS OF STREAMING MEDIA NETWORK TEST TRAFFIC IN PACKET-BASED NETWORKS

(75) Inventors: Marc A. C. Todd, Foxboro, MA (US); Jesse D. Beeson, Franklin, MA (US); James T. Welch, Mashpee, MA (US)

(73) Assignee: Ineoquest Technologies, Inc., Mansfield, MA (US)

( * ) Notice: Subject to any disclaimer, the term of this patent is extended or adjusted under 35 U.S.C. 154(b) by 0 days.

(21) Appl. No.: 13/184,163

(22) Filed: Jul. 15, 2011

(65) Prior Publication Data

US 2012/0014254 A1 Jan. 19, 2012

Related U.S. Application Data

(63) Continuation of application No. 12/336,210, filed on Dec. 16, 2008, which is a continuation of application
(Continued)

(51) Int. Cl.
*H04L 12/26* (2006.01)
*H04L 29/06* (2006.01)

(52) U.S. Cl.
CPC .... *H04L 12/2602* (2013.01); *H04L 29/06027* (2013.01); *H04L 43/00* (2013.01); *H04L 65/80* (2013.01); *H04L 43/0829* (2013.01)

(58) Field of Classification Search
CPC .......... G06F 11/104; G06F 15/16; H04L 1/00; H04L 1/0045; H04L 1/20; H04L 12/26;
(Continued)

(56) References Cited

U.S. PATENT DOCUMENTS 5,138,615 A 8/1992 Lamport et al.
5,835,500 A * 11/1998 Schiller ......................... 714/704
(Continued)

OTHER PUBLICATIONS

Hartanto, et al., "Cumulative Inter-ADU Jitter Concept and Its Applications", 2001, pp. 531-534, Dept. of Information Engineering, The Chinese University of Hong Kong, Shatin, NT, Hong Kong; Dept. of Electrical and Electronic Engineering, University of Canterbury, Christchurch, New Zealand.
(Continued)

*Primary Examiner* — Andrew Lai
*Assistant Examiner* — Leon Andrews
(74) *Attorney, Agent, or Firm* — Brian J. Colandreo; Michael T. Abramson; Holland & Knight LLP (57) ABSTRACT

A packetized streaming media delivery network carries many "streams" of differing media content. They often are from multiple sources and of different media types. The invention consists of a scalable hardware and/or software computing element resolving the network traffic into its individual streams for focused, simultaneous, and continuous real-time monitoring and analysis. The monitoring and analysis consists of delay factor and media loss rate which measure the cumulative jitter of the streaming media within the delivery network and the condition of the media payload. These measurements form a powerful picture of network problem awareness and resolution. The delay factor objectively indicates the contribution of the network devices in the streams' path, allowing for both problem prediction and indication. In one example, tapping a packetized network at various locations allows for correlation of the same-stream performance at various network points to pinpoint the source(s) of the impairment(s).

14 Claims, 7 Drawing Sheets

Related U.S. Application Data

No. 11/396,753, filed on Apr. 3, 2006, which is a continuation-in-part of application No. 10/604,997, filed on Aug. 29, 2003, now Pat. No. 7,321,565, and a continuation-in-part of application No. 11/257,183, filed on Oct. 24, 2005, now Pat. No. 8,031,623.

(60) Provisional application No. 60/621,824, filed on Oct. 25, 2004.

(58) Field of Classification Search
CPC ............... H04L 12/66; H04L 29/06027; H04L 29/08072; H04L 47/10; H04L 1/145; H04L 65/605; H03M 13/00; H04N 7/173; H04Q 11/0478
See application file for complete search history.

(56) References Cited

U.S. PATENT DOCUMENTS

| | | | |
|---|---|---|---|
| 5,983,278 A | 11/1999 | Chong et al. | |
| 6,412,004 B1 | 6/2002 | Chen et al. | |
| 6,421,350 B1 | 7/2002 | Szurkowski et al. | |
| 6,480,977 B1 | 11/2002 | Apisdorf et al. | |
| 6,609,226 B1* | 8/2003 | Figueira | 714/807 |
| 6,728,213 B1* | 4/2004 | Tzeng et al. | 370/235 |
| 6,738,813 B1* | 5/2004 | Reichman | 709/224 |
| 6,765,904 B1 | 7/2004 | Anandakumar et al. | |
| 6,801,938 B1 | 10/2004 | Bookman et al. | |
| 6,803,964 B1 | 10/2004 | Post et al. | |
| 6,807,156 B1* | 10/2004 | Veres et al. | 370/252 |
| 6,928,055 B2* | 8/2005 | Ni | 370/235 |
| 6,981,180 B1* | 12/2005 | Bailey | H04L 41/145 |
| | | | 714/38.11 |
| 7,065,052 B1* | 6/2006 | McBride | 370/252 |
| 7,099,281 B1* | 8/2006 | Conway | H04L 1/20 |
| | | | 370/252 |
| 7,203,869 B2 | 4/2007 | Gwak | |
| 7,242,681 B1 | 7/2007 | Van Bokkelen et al. | |
| 7,313,593 B1 | 12/2007 | Pulito et al. | |
| 7,321,565 B2 | 1/2008 | Todd et al. | |
| 7,376,132 B2 | 5/2008 | Conway | |
| 7,543,051 B2 | 6/2009 | Greifeneder et al. | |
| 7,945,688 B1* | 5/2011 | Lango | H04L 65/605 |
| | | | 709/203 |
| 8,031,623 B2 | 10/2011 | Beeson et al. | |
| 8,588,069 B2 | 11/2013 | Todd et al. | |
| 8,838,772 B2 | 9/2014 | Beeson et al. | |
| 2002/0016839 A1 | 2/2002 | Smith et al. | |
| 2002/0136203 A1 | 9/2002 | Liva et al. | |
| 2002/0144263 A1 | 10/2002 | Eldering et al. | |
| 2003/0007568 A1 | 1/2003 | Hamery et al. | |
| 2003/0009589 A1 | 1/2003 | Apostolopoulos et al. | |
| 2003/0033403 A1* | 2/2003 | Rhodes | 709/224 |
| 2003/0043755 A1 | 3/2003 | Mitchell | |
| 2003/0046403 A1 | 3/2003 | Schmidt | |
| 2003/0202536 A1 | 10/2003 | Foster et al. | |
| 2003/0221013 A1 | 11/2003 | Lockwood et al. | |
| 2003/0226089 A1* | 12/2003 | Rasmussen | H04L 1/004 |
| | | | 714/758 |
| 2004/0032916 A1 | 2/2004 | Takashima | |
| 2004/0117427 A1* | 6/2004 | Allen et al. | 709/200 |
| 2004/0136327 A1* | 7/2004 | Sitaraman et al. | 370/252 |
| 2004/0240447 A1 | 12/2004 | Dorbolo et al. | |
| 2005/0071876 A1 | 3/2005 | van Beek | |
| 2005/0080900 A1 | 4/2005 | Culbertson et al. | |
| 2006/0005099 A1* | 1/2006 | Strasman et al. | 714/746 |
| 2006/0029067 A1 | 2/2006 | Conway | |
| 2006/0085553 A1 | 4/2006 | Rachwalski et al. | |
| 2006/0088035 A1 | 4/2006 | Beeson et al. | |
| 2006/0136578 A1 | 6/2006 | Covell et al. | |
| 2006/0140116 A1 | 6/2006 | Alicherry et al. | |
| 2006/0184670 A1 | 8/2006 | Beeson et al. | |
| 2008/0052404 A1* | 2/2008 | Leighton | H04L 29/06 |
| | | | 709/231 |
| 2009/0097413 A1 | 4/2009 | Todd et al. | |
| 2014/0215026 A1 | 7/2014 | Beeson et al. | |

OTHER PUBLICATIONS

Cho, Young H., et al, "Fast Reconfiguring Deep Packet Filter for 1 + Gigabit Network", University of California, Los Angeles, Department of Electrical Engineering, Laos Angeles, California 90095, Sep. 2003.

Hummel, Richard J., "High-Speed Packet Filtering Utilizing Stream Processors", Department of Computer Science, Wake Forest University, Winston-Salem, NC, Oct. 2003.

Notice of Allowance issued on Jul. 14, 2015 in counterpart U.S. Appl. No. 14/242,115.

Non-Final Office Action issued on Feb. 4, 2015 in counterpart U.S. Appl. No. 14/242,155.

Non-Final Office Action issued on Mar. 16, 2009 in counterpart U.S. Appl. No. 11/257,183.

Final Office Action issued on Nov. 4, 2009 in counterpart U.S. Appl. No. 11/257,183.

Non-Final Office Action issued on Jun. 10, 2010 in counterpart U.S. Appl. No. 11/257,183.

Final Office issued on Dec. 20, 2010 in counterpart U.S. Appl. No. 11/257,183.

Notice of Allowance issued on Jun. 8, 2011 in counterpart U.S. Appl. No. 11/257,183.

Non-Final Office Action issued on Jul. 7, 2009 in counterpart U.S. Appl. No. 11/396,753.

Non-Final Office Action issued on May 11, 2010 in counterpart U.S. Appl. No. 11/396,753.

Final Office Action issued on Nov. 24, 2010 in counterpart U.S. Appl. No. 11/396,753.

Non-Final Office Action issued on Aug. 18, 2011 in counterpart U.S. Appl. No. 11/396,753.

Non-Final Office Action issued on May 8, 2012 in counterpart U.S. Appl. No. 11/396,753.

Non-Final Office Action issued on May 2, 2013 in counterpart U.S. Appl. No. 11/396,753.

Notice of Allowance issued on Dec. 26, 2013 in counterpart U.S. Appl. No. 11/396,753.

Non-Final Office Action issued on Aug. 17, 2010 in counterpart U.S. Appl. No. 12/336,210.

Final Office Action issued on Apr. 6, 2011 in counterpart U.S. Appl. No. 12/336,210.

Non-Final Office Action issued on Nov. 28, 2011 in counterpart U.S. Appl. No. 12/366,210.

Final Office Action issued on Oct. 3, 2012 in counterpart U.S. Appl. No. 12/366,210.

Notice of Allowance issued on Jul. 15, 2015 in counterpart U.S. Appl. No. 12/366,210.

* cited by examiner

SYSTEM AND METHOD FOR CREATING MULTIPLE TRANSPORTATION STREAMS OF STREAMING MEDIA NETWORK TEST TRAFFIC IN PACKET-BASED NETWORKS

CROSS REFERENCE TO RELATED APPLICATIONS

The subject application is a continuation application of U.S. application Ser. No. 12/336,210, filed 16 Dec. 2008, which is a continuation of U.S. application Ser. No. 11/396,753, filed 3 Apr. 2006, which is a CIP of U.S. application Ser. No. 10/604,997, filed 29 Aug. 2003. U.S. application Ser. No. 11/396,753 is also a CIP of U.S. application Ser. No. 11/257,183, filed 24 Oct. 2005, which claims the benefit of U.S. Provisional Application Ser. No. 60/621,824, filed 25 Oct. 2004. The entire disclosure of all of the preceding applications are herein incorporated by reference.

BACKGROUND

Technical Field

The present invention relates generally to the field of streaming. More specifically, the present invention is related to analyzing streaming data in packetized form.

Background Information

Many electronic networks such as local area networks (LANs), metropolitan area networks (MANs), and wide area networks (WANs) are increasingly being used to transport streaming media whose real-time data transport requirements exhibit high sensitivity to data loss and delivery time distortion. The technical literature is replete with various schemes to implement Quality of Service (QOS) on such networks to address the requirements of streaming media, especially when intermixed with conventional, time-insensitive, guaranteed delivery protocol stack data traffic. Furthermore, for efficiency reasons, the streaming media transport often uses a non-guaranteed delivery upper layer protocol stack such as UDP/IP making recovery of data in the presence of packet loss difficult. Regardless of whether QOS-enabled or non-QOS-enabled networks are employed, it is necessary to monitor the behavior of packet loss, delivery time distortion, and other real-time parameters of the network to assure satisfactory quality streaming media delivery.

There exists a variety of defined Management Information Bases (MIBs) which include definitions for a number of network parameters such as packet loss, inter-arrival times, errors, percentage of network utilization, etc., whose purpose is to indicate to a network manager the general operating conditions of the network. Such traditional forms of monitoring network behavior cannot easily indicate the effects that network performance has on a single or a group of individual streaming media streams. Data gathering from MIBs operating across a range of network layers combined with a highly skilled and experienced practitioner would be required to simply determine the jitter imposed on a single MPEG video stream, for instance, and would only be possible by post-processing data gathered while the network was in operation. Determining the cause of a fault in a streaming media stream may be possible through such analysis but lacks the real-time indication of a network fault that is required to maintain high-quality networks such as for video or audio delivery. It also does not address the need to monitor large numbers of streams in real-time such as streams of Video-on-Demand (VoD) networks using less technically skilled operations personnel, as would be necessary to enable implementation of continuous cost-effective quality control procedures for widely deployed networks such as for VoD.

Histograms are often used in prior art schemes to present the arrival time behavior of packets on a network, but such histograms only represent the aggregate behavior of packets arriving at the measurement node due to the need to combine MIB data from a range of network layers to extract sufficient information to track a particular stream's performance. Traditional histograms define the jitter between any two packets. Streaming media requires more in-depth knowledge, such as the time variation across many packets referred to as the "network jitter growth". This network jitter growth affects the streaming media quality as experienced by the user due to intermediate buffer overflow/underflow between the media source and its destination.

Network jitter growth of a media stream due to traffic congestion can also be an indicator of an impending fault condition and can thus be used to avoid transport failures rather than simply to react to faults after they occur. Conventional post-processed MIB analysis is inadequate for these purposes as described above.

The concept of regulating stream flow in a network based on the leaky bucket paradigm describes a methodology that might be used to prevent intermediate buffer overflow and packet jitter by regulating the outflow of data based on a set of parameters configured to optimize a particular flow. This does not address the need to analyze and continuously monitor multiple streams as is required during the installation and operation of networks carrying streaming media, especially for those enterprises whose revenue is derived from the high quality delivery of streaming media, such as broadcast and cable television entities.

A common prior art scheme used to effectively monitor multiple video streams is to decode each stream's MPEG content (for the video example) and display the streams on a large group of television screens. Monitoring personnel then watch the screens looking for any anomalous indications and take appropriate corrective action. This is a highly subjective and error prone process, as there is a possibility that a transient fault might be missed. This is also a reactive process, as corrective action can only be taken after a fault has occurred. Furthermore, this is also an expensive process in terms of both equipment and personnel costs. It also provides little or no indications of the root cause of the fault, thus adding to the time required for implementing corrective action. This approach also does not easily scale to modern video delivery systems based upon emerging, cost-effective high-bandwidth, networks intended to transport thousands of independent video streams simultaneously. In addition, this approach cannot pinpoint the location of the fault. To do so, the personnel and equipment must be replicated at multiple points in the distribution network, greatly increasing the cost. For this to be effective, the personnel must monitor the same stream at exactly the same time for comparison.

Many types of network delivery impairments are transient in nature affecting a limited number of packets during a period of momentary traffic congestion, for example. Such impairments or impairment patterns can be missed using traditional monitoring personnel watching video monitors. By not recognizing possible repeating impairment patterns, faults can exist for much longer periods because after the fault has passed, there is no residual trace information available for analysis. The longer a fault persists, the worse the customer satisfaction levels, and the greater the potential for lost revenues.

Whatever the precise merits, features, and advantages of the above-mentioned prior art schemes, they fail to achieve or fulfill the purposes of the present invention.

SUMMARY

The present invention provides for a system and method for analyzing packetized network traffic. In one embodiment, the system comprises: (a) one or more interfaces to forward a copy of the network traffic comprising one or more streams; (b) one or more filters to receive and filter the forwarded network traffic to isolate at least one stream; and (c) a native streaming interface to receive packetized data corresponding to the isolated stream(s), wherein the native streaming interface provides minimum time distortion to permit media stream analysis and monitoring to indicate the network's influence on the isolated stream(s) and measure each isolated stream's conformance to a pre-determined stream standard.

In one embodiment, the system for analyzing packetized network traffic comprises: (a) a compute engine to compute statistics associated with an isolated stream, wherein the statistics for each stream comprise at least a delay factor (DF) defining an instantaneous flow rate balance representing a virtual buffer delay that is needed to prevent data loss and absorb network jitter growth; and (b) one or more interfaces to forward the computed statistics for each streams of interest to a data consumer.

In another embodiment, the present invention provides for a system and method for analyzing packetized network traffic comprising one or more transportation streams. The system comprises: (a) one or more network interfaces to receive streaming network traffic associated with the transportation streams; (b) one or more filters to filter one or more streams of interest in the received transportation streams; (c) a compute engine comprising one or more finite state machines to compute index values associated with the streams of interest, wherein the index values for each stream comprising at least: a delay factor (DF) and a media loss rate (MLR); and (d) one or more interfaces to forward the computed index values for the streams of interest to a data consumer.

In another embodiment, the present invention's method comprises the steps of: (a) receiving network traffic comprising one or more transportation streams; (b) filtering the received traffic and isolating a transportation stream from the transportation streams; (c) computing statistics associated with the isolated transportation stream, wherein the statistics comprise at least a delay factor (DF) and a media loss rate (MLR); and (d) forwarding the computed statistics to a data consumer.

The DF value defines an instantaneous flow rate balance representing a virtual buffer delay that is needed to prevent data loss and absorb network jitter growth, and the MLR value represents the number of media packets lost or corrupted.

The features and advantages described herein are not all-inclusive and, in particular, many additional features and advantages will be apparent to one of ordinary skill in the art in view of the drawings, specification, and claims. Moreover, is should be noted that the language used in the specification has been principally selected for readability and instructional purposes, and not to limit the scope of the inventive subject matter.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

As used in this document, the term "computer" is meant to encompass a workstation, personal computer, personal digital assistant (PDA), wireless telephone, or any other suitable computing device.

The system and method embodying the present invention can be programmed in any suitable language and technology, such as, Hypertext Markup Language (HTML), Active ServerPages (ASP) and Javascript. Alternative versions maybe developed using other programming languages including, but not limited to: C++; Visual Basic; Java; VBScript; Jscript; BCMAscript; DHTM1; XML and CGI. Any suitable database technology can be employed, but not limited to: Microsoft Access and IBM AS 400.

While this invention is illustrated and described in particular embodiments, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Many streaming media systems, such as VoD, broadcast television control centers, or satellite-based video distribution operations utilize packetized data networks for their low-cost and omnipresence in modern data systems. The present invention monitors these existing network conduits by sampling the data contained therein with minimal alteration of its characteristics.

Figure 1A:
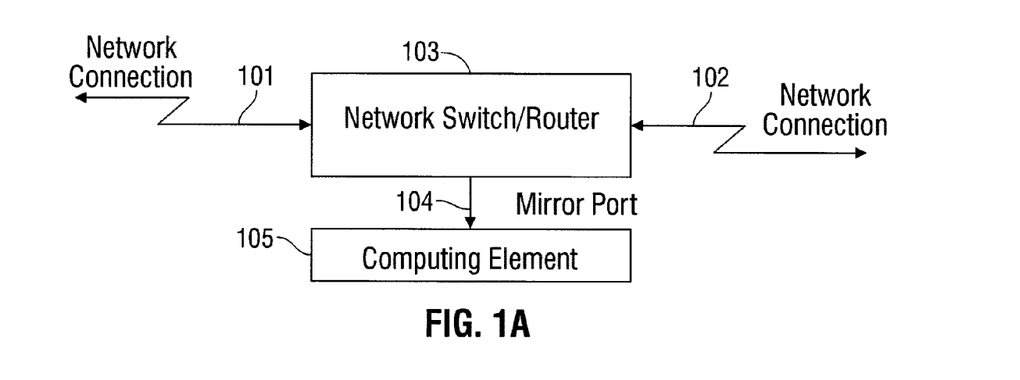
FIGS. 1a-c illustrate several methods of tapping an existing network traffic flow via the present invention's computing element.
Figure 1B:
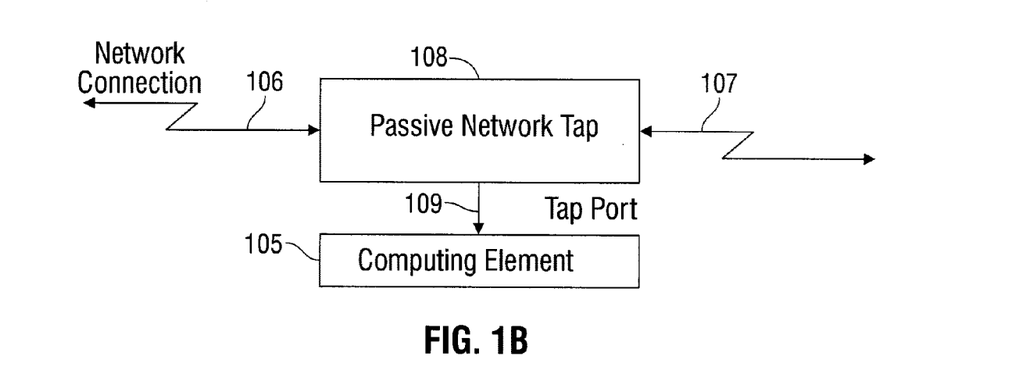
Figure 1C:
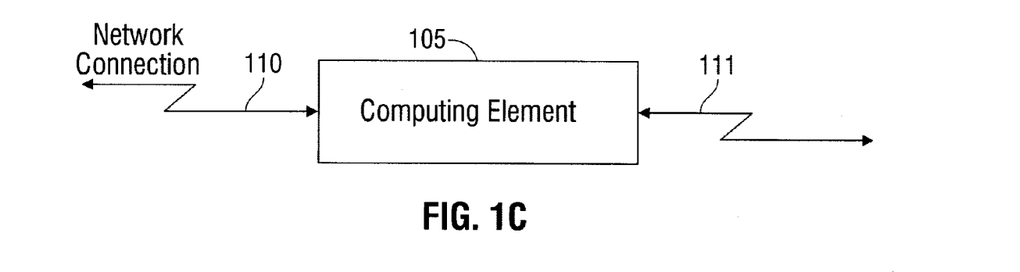

FIGS. 1a-c illustrate several methods of tapping an existing network traffic flow via the present invention's computing element 105. FIG. 1a illustrates a setup wherein an ordinary network switch or router 103, which, while performing packet switching or routing on the traffic from its many ports, such as 101 and 102, also provides for a "mirror" or "monitor" port 104. Port 104 makes all data from a desired port available to the present invention's computing element 105. Alternatively, as shown in FIG. 1b, a passive network tap 108 diverts a portion of the network traffic flow energy from one network port 106 to the other network port 107 and transmits that portion via a port 109 to the present invention's computing element 105. FIG. 1c illustrates yet another method to tap the existing network flow via inserting the present invention's computing element 105 directly in-line with the network link to be observed via network ports 110 and 111.

In the examples of FIGS. 1a-b, the computing elements 105 used in each case are identical. In the example of FIG. 1c, the computing element 105 also actively forwards all traffic from network connection 110 to network connection 111 and vice versa, while simultaneously providing all traffic to the equivalent internal functionality of the computing elements designated 105.

Figure 2:
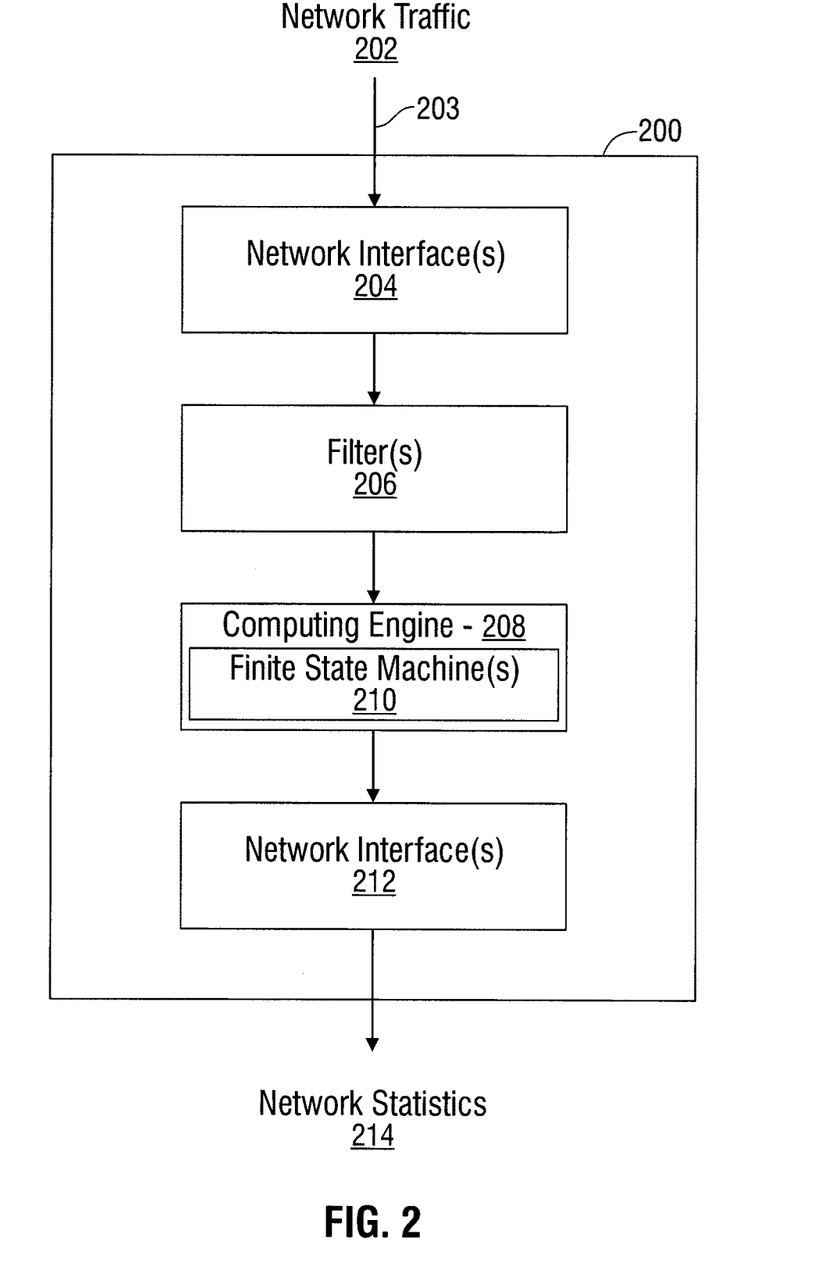
FIG. 2 illustrates one embodiment of the present invention's computing element which analyzes network traffic.

FIG. 2 illustrates one embodiment of the present invention's computing element 105 which analyzes network traffic 202. Computing element 105 comprises at least one network interface 204 to receive network traffic, one or more filters 206 to filter the received network traffic, at least one computing engine 208 to compute network statistics associated with the filtered network traffic via one or more finite state machines 210, and at least one network interface 212 to accept control instructions and transmit the computed statistics to a data consumer. Network interface 204 interfaces with the network link to be monitored via network connections 203. Network link protocols that support such packet-based transmission include, but are not limited to, 802.3 (Ethernet), 802.4, 802.5, USB, ATM, SONET, 802.11, Fibre-channel, Firewire or 1394, Infiniband, Bluetooth, 802.11, 802.15, 802.16, 802.17, ZigBee, or a native streaming video interface such as DVB-ASI.

The streaming media traffic of interest, which may consist of many individual streams of traffic, is filtered (via one or more filters 206) from the incoming network traffic 202 and processed by the finite state machines 210 of computing engine 208 to reduce its measured transmission characteristics to a set of statistics or critical parameters known as an "Index". The Index can be communicated to a logging system with alarm values set for convenient human monitoring. For example, warnings can be forwarded to a data consumer when the computed statistics exceeds a predetermined threshold or rate-of-change. It should be noted that one computing engine can be used to track several streams of interest. Similarly, one or more computing engines can be used to track several streams of interest. Hence, the number of computing engines or the number of streams to be tracked should not be used to limit the scope of the present invention.

In one preferred embodiment, the Index, known as the Media Delivery Index (MDI) consists of two parts: the Delay Factor (DF) and the Media Loss Rate (MLR). This embodiment is especially valuable for constant bit rate MPEG-2 Transport Streams carried over a network such as a packetized network. The DF represents the Instantaneous Flow Rate Balance (IFRB) and is derived in the computing element. The MLR represents the number of lost or corrupted media packets and is readily derived from tracking the Continuity Counter (CC) for the MPEG-2 transport stream application or from a sequence counter or the like for protocols, such as RTP, which support the same. The MDI (DF:MLR) then represents the two key factors which describe the dynamic behavior of streaming media over packetized networks: packet jitter growth and packet loss. This Index provides at-a-glance determination of traffic impairment as well as an indication of the operating margin of a network. By modifying the calculation of the IFRB, the DF may also be used with variable bit rate streaming media transport over packetized networks.

Figure 3:
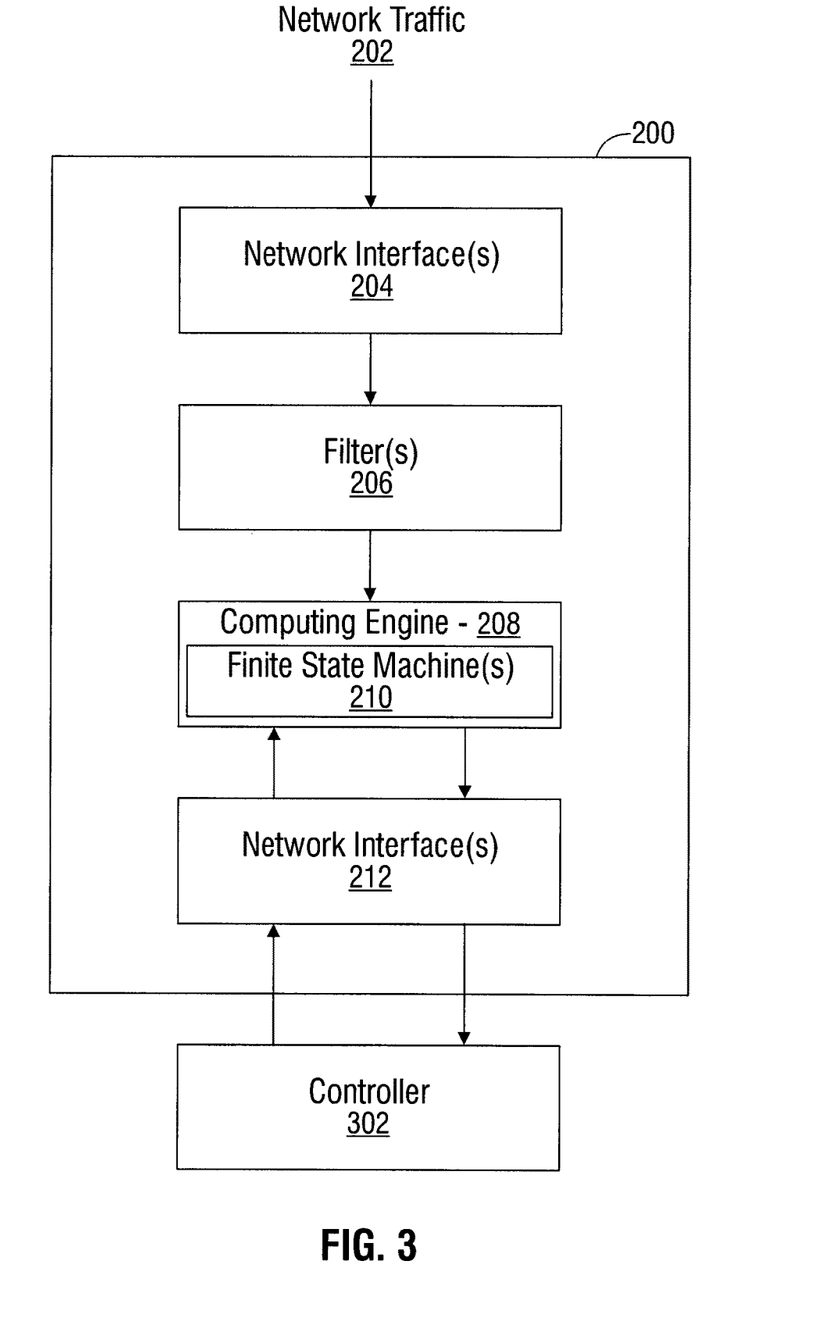
FIG. 3 illustrates an extended embodiment of the present invention wherein a controller is used for controlling the computing element.

FIG. 3 illustrates an extended embodiment of the present invention wherein a controller 302 is used for controlling the computing element 105. Controller 302 transmits, via an interface, control instructions from a management system to modify system-level state-based logic data associated with the computing element 105, and receives, via the interface, the analysis results generated by the computing element 105.

Figure 4:
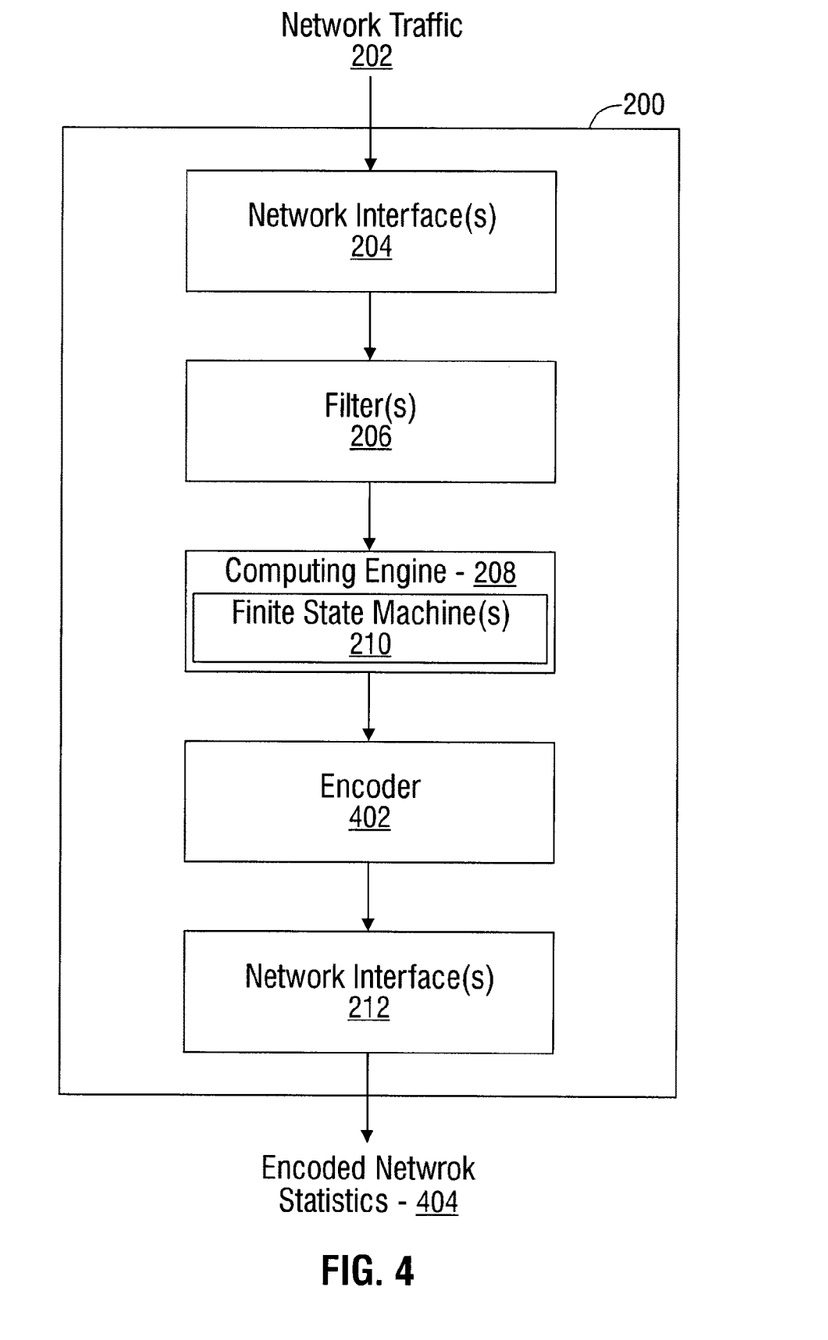
FIG. 4 illustrates another extended embodiment of the present invention wherein an encoder is used to encode the statistics calculated by the computing engine.

FIG. 4 illustrates another extended embodiment of the present invention wherein encoder 402 is used to encode the statistics calculated by computing engine 208. Then, the encoded statistics 404 is transmitted to a data consumer via one or more interfaces 212. Some examples of encoding include (but are not limited to) encryption (such as for security), compression, or code format conversion (e.g., convert data in an ASCII format for readability).

Figure 5:
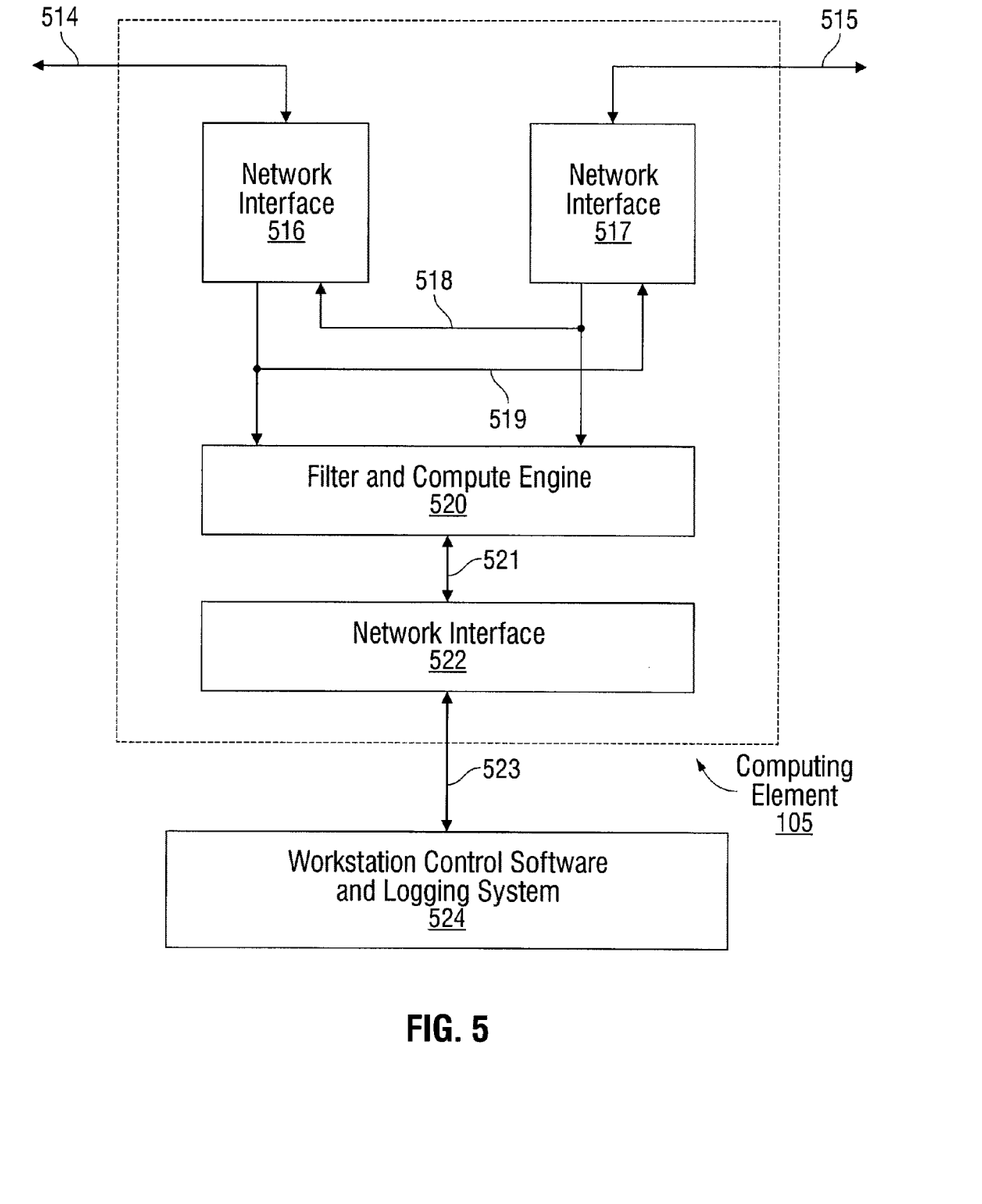
FIG. 5 illustrates an internal block diagram of the computing element and its interconnection with the control and logging system.

It should be noted that more than one network interface can be used to receive network traffic. For example, FIG. 5 illustrates computing element 105 (as used in FIG. 1c) with two network interfaces 516 and 517, wherein computing element 105 is used for analyzing one or more streaming media flows. The two network interfaces 516 and 517 interface with the network link to be monitored via network connections 514 and 515. As in FIG. 2, network link protocols that support such packet-based transmission include, but are not limited to, 802.3 (Ethernet), 802.4, 802.5, USB, ATM, SONET, 802.11, Fibrechannel, Firewire or 1394, Infiniband, Bluetooth, 802.11, 802.15, 802.16, 802.17, ZigBee, or DVB-ASI. In operation, data received from network connection 515 is decoded via network interface 517 and the resulting data is forwarded to the filter and compute engine 520 and to the other network interface 516. Then, network interface 516 forwards the data to the network connection 514, thus completing the connection from network interface 515. Thus, all data received from network interface 515 is forwarded to network interface 514 with a minimum of distortion while making all the same data available for analysis by other components of the computing element. Likewise, all data from network connection 514 is forwarded to network connection 515 while also being forwarded to the filter and compute engine 520. The result is a continuous full duplex connection between network connections 514 and 515 providing an uninterrupted network traffic flow while simultaneously providing all network data to the filter and compute engine 520. Alternatively, as per FIG. 1a and FIG. 1b, the computing element 105 may require only a single network interface, but otherwise performs as described above, with network data being forwarded to the filter and compute engine 520.

The filter and compute engine 520 is configured via interface 521 such that it can filter the desired streaming media flows from other network traffic types for further analysis. For example, to analyze MPEG-2 streaming video over UDP/IP protocols, the filter can be configured to accept only layer-2 packets with the IP protocol type and only IP frames with UDP protocol types and only UDP datagrams that encapsulate MPEG-2 transport streams. After performing the appropriate filtering function, the compute engine calculates the components that comprise the Index value for a given streaming media flow. The Index values, and other statistics regarding the flow, are forwarded to the network interface 522 via interface 521. Then, interface 523 is used to convey the Index values to a data consumer such as an application running, for example, in a workstation consisting of control software and a logging system 524, collectively referred to as a "management" system. Network Interface 522 need not be the same type as 516 or 517 (i.e., a RS-232 serial port). Its bandwidth via the choice of physical and link layer protocols may be scaled or sized to match the amount of data expected to be handled. It should be noted that network interface 522, interface 523, and workstation (management system) 524 may be physically co-located with the computing element 105 and need not be external.

Figure 6:
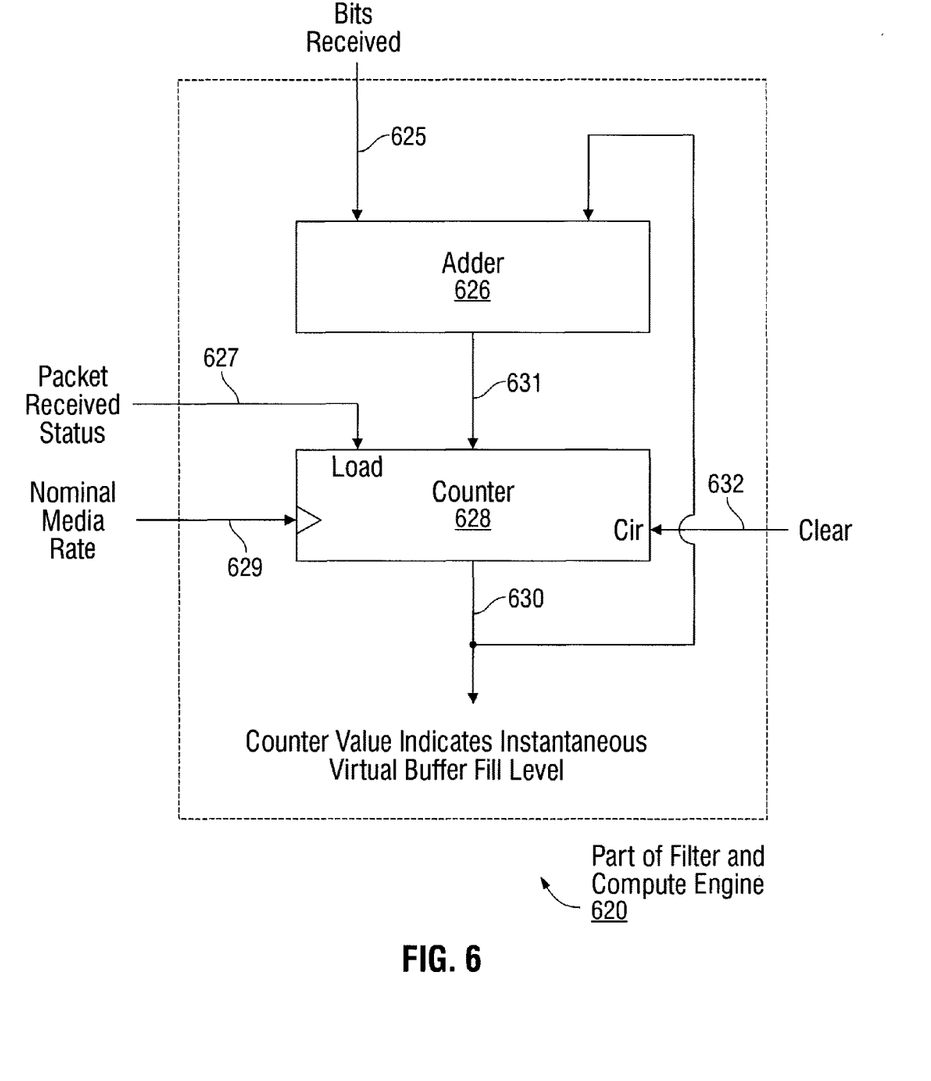
FIG. 6 illustrates an adder and a counter that form a part of the compute engine.

In one embodiment, the compute engine comprises at least one finite state machine counter as shown in FIG. 6. The finite state machine counter is used to compute an Instantaneous Flow Rate Balance (IFRB). Counter 628 is loaded when a packet has been received via 627. The counter is loaded with the sum of the current count and the number of bits received in this packet 625 from the adder 626. Counter 628 decrements its count at each clock input pulse 629 whose rate is set to the nominal streaming media rate. Further, counter 628 is cleared at any time via the 632 clear signal. The counter output 630 indicates the number of bits that have been received at the point of test but not yet consumed, assuming that a virtual terminal device which consumes or "uses" the streaming media flow (such as a video decoder for a streaming video media case) drains the data received at a nominal media rate at this network location. Thus, the counter output 630 represents the size of a buffer that would be needed to prevent data loss and absorb the network jitter growth due to data arriving via a packetized network. It should be noted that counter 628 may also result in negative numbers during periods between a burst of data thus representing the size of a virtual terminal's buffer needed to be prefilled to avoid underflow. Adder 626 and counter 628 may also be combined into a single entity to simply track the net difference between bits received on the packetized network side and the bits out based upon an expected drain rate. The actual quantity being tracked may be bits or any derivative thereof (bytes, words, etc.). It is important to note that the bits counted are only those subject to the drain rate. Typically, this is the payload of the packet (i.e., no headers or overhead.) For example, in the case of an MPEG-2 transport stream sent via Ethernet IP/UDP, the bits tracked would typically be the MPEG-2 transport stream packets contained within the Ethernet frame, excluding the IP/UDP headers and Ethernet CRC. The present invention further extends to using streaming media streams that are variable bit rate in nature. Variations in media bit rate may be accommodated by monitoring and updating the expected drain rate used in IFRB calculation along with the stream. Since this finite state machine is simple, it can operate at common media rate speeds and can be replicated easily and compactly if implemented in hardware such as an FPGA, ASIC, or discrete logic, making possible an array of such machines such that one may be dedicated to each streaming media flow. Furthermore, the filter and compute engine can also be configured to capture and track other streaming media flow parameters of interest such as an MPEG-2 transport steam's continuity counters to detect dropped or corrupted packets, stream identifiers, etc.

It should be noted that computing the Instantaneous Flow Rate Balance (IFRB), and thus DF, requires knowledge of the expected media drain rate either by prior knowledge or by measurement. The expected drain rate, and thus stream bitrate, may also be referred to as the media consumption rate, as this is the rate at which the receiver of the media stream must consume that stream. It is possible that the local estimation of the drain rate may drift or be offset with respect to the actual media streams' bitrate due to frequency drift or offset between the source of the media streams' clock and our local processing clock. This drift or offset causes monotonically increasing or decreasing IFRB and virtual buffer calculations, and may be mitigated by periodically clearing the current state of the IFRB and virtual buffer. Another approach utilizes a well known method entailing Phase Locked Loops (PLL) or Delay Locked Loops (DLL) to remove the drift or offset.

Returning to the discussion of FIG. 5, streaming media flow parameters as described above can be forwarded via a network Interface 521, and network connection 522, and external network 523, or via any type data interface as they are captured or buffered in a memory in the filter and compute engine for later retrieval by a workstation 524. In some instances, the streaming media content itself may be presented to the workstation 524 via the same path for additional analysis. They may be combined with a time stamp at either the filter and compute engine 520 or the workstation 524. Long term logs may be maintained by 524 for trend analysis, coincident analysis with other network events, the start and end of particular streaming media flows, etc. Alternatively, workstation 524 can show an instantaneous view of streaming media parameters for human monitoring. High and low watermark values may be set in the computing element 105 or in the workstation 524 for the Index parameter or any measured parameter, such that if exceeded, will be logged or trigger an alarm; this functionality may be used to warn of possible impending faults such as deviations from nominal in the flow rates that could cause a network or terminal device buffer to overflow or underflow. The Index value indicates the network's instantaneous operating jitter margin. Additionally, the rate of sampling of such parameters can be reduced to decrease the load on interface 523 during benign network conditions or increased to provide a more detailed analysis of an identified fault. Either the computing element or workstation 524 may produce long term analysis as well by performing additional computational operation on the IFRB.

In some instances, workstation 524 functionality may be integrated with the filter and compute engine for a direct display of information to the user.

It should be noted that a pure hardware, a pure software, and a hybrid hardware/software implementation of the filter and compute engine components is envisioned and should not be used to limit the scope of the present invention.

It should be noted that various kinds of interfaces can be used for establishing a packet-based communication session between the external interfaces (514 or 515 or 523) and the computing element, such as (but not limited to) a gigabit Ethernet network controller or a 10/100 Mbit/s Ethernet network interface card. Moreover, one skilled in the art can envision using various current and future interfaces and, hence, the type of packetized network interface used should not be used to limit the scope for the present invention.

In one embodiment, bandwidth for the transportation of network parameters via interface 523 as discussed above is allocated in an "on-demand" fashion, wherein full channel (network conduit) bandwidth is allocated and available to the data consumer. Compute engine 520 can track nearly any set of parameters or events, such as the last N-packets received or statistics acquired, storing it in a circular buffer. Thus, when a critical event occurs such as streaming media data loss, bandwidth would be allocated "on-demand" to report the tracking information leading up to the critical event to the workstation analysis device 524 through the interface 523. Having pertinent information about what traffic the network was handling (not only at the time of the critical event but leading up to it as well) presented "on-demand" at the time of the critical event is very powerful. Having this information greatly reduces the "hunting" time required to identify the cause of the critical event. This information could be gathered remotely as well, given a suitable network type for 523. Expanding on the "on-demand" possibilities for parameter reporting, bandwidth may also be allocated "on-demand" on either network interfaces 514 or 515 in an in-band reporting fashion, facilitating the monitoring by equipment on the same distribution network as the streaming media.

If the network Interface 523 is an ASI (Asynchronous Serial Interface, as in DVB-ASI) type and the streaming media content itself is presented to the Interface in such a way as to minimize instrument timing distortions, a conventional streaming media specific analyzer or monitor may be utilized to not only measure the stream's conformance to expected stream standards but also to indicate the influence of network behavior. In this configuration, the computing element may be thought of as a protocol converter as well.

The present invention's system can be used in debugging various embedded systems within the streaming media's transport network. Various equipment utilized in the transportation or creation of the streaming media may allow debugging and/or parameter manipulation via the transport network as well as provide its own statistical operational information (i.e., its own system "health"). This makes possible the cross-correlation of the system's overall state/health. The invention acquires such control information via a network channel and may use its filter and compute engine capabilities to provide either the raw or processed data to a Workstation Monitor/Logger as described for Index data above.

The present invention allows the implementer the ability to scale the amount of in-band or out-of-band measured or sampled data to pass through the system up to the maximum supported by the network conduit and down to nothing. Additionally, the present invention provides the ability to scale with improvements in network conduit technology. For example, the faster the network conduit, the more measurements or sampled data can pass. Moreover, as high-speed systems continue to evolve, their network conduit's bandwidth is usually increased proportionately to facilitate the use of the high-speed system itself (i.e., a faster network conduit is part of the main feature-set of the system; bandwidth is thereby increased by necessity). The present invention accommodates such increases in bandwidth associated with the network conduit and utilizes such high-speed systems to extract measurements or sampled data at a faster rate.

Figure 7:
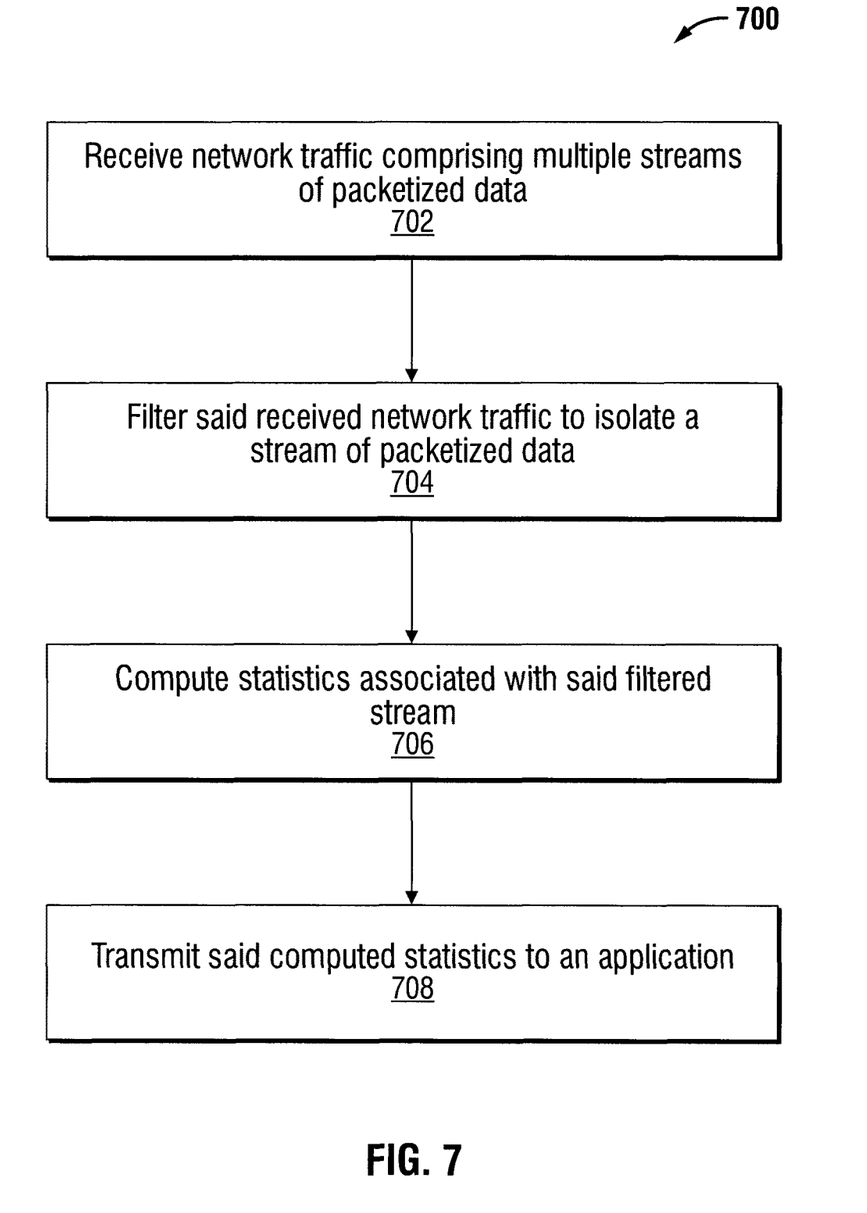
FIG. 7 illustrates a method associated with the present invention.

FIG. 7 illustrates a method 700 associated with an embodiment of the present invention. In step 702, network traffic is received by a network interface, wherein the traffic comprises one or more streams of packetized data. Next, in step 704, the received traffic is filtered to isolate at least one stream of packetized data. In step 706, an Index is computed for the filtered stream of packetized data. In one preferred embodiment, the Index, known as the Media Delivery Index (MDI), consists of two parts: the Delay Factor (DF) and the Media Loss Rate (MLR). The DF represents the Instantaneous Flow Rate Balance (IFRB) and is derived in the computing element as described earlier. The MLR represents the number of lost or corrupted media packets and is readily derived from tracking the Continuity Counter (CC) for the MPEG-2 transport stream application or from a sequence counter or the like for protocols, such as RTP, which support the same. The MDI (DF:MLR) then represents the two key factors which describe the dynamic behavior of streaming media over packetized networks: packet jitter growth and packet loss. This Index provides at-a-glance determination of traffic impairment as well as an indication of the operating margin of a network. Then, in step 708, the computed statistics are forwarded to a data consumer, such as one running in a workstation. In one embodiment, a quality of service (QOS) metering scheme is implemented based upon adjusting traffic priority between the forwarded computed network statistics and the streaming network traffic.

Furthermore, the present invention includes a computer program code-based product, which is a storage medium having program code stored therein which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Implemented in computer program code-based products are: (a) receiving network traffic comprising one or more transportation streams; (b) filtering the received traffic and isolating a transportation stream from the transportation streams; (c) computing statistics associated with the isolated transportation stream comprising at least a delay factor (DF) and a media loss rate (MLR), wherein DF defines an instantaneous flow rate balance representing a buffer size that is needed to prevent data loss and absorb network jitter growth, and MLR represents the number of media packets lost or corrupted; and (d) forwarding the computed statistics to a data consumer.

CONCLUSION

A system and method has been shown in the above embodiments for the effective implementation of a system and method for measuring and exposing the dynamic behavior of streaming media over a packet-based network. While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by the number of network interfaces, number of filters, number of streams handled by the compute engine, type of packetized network conduit, location of control software, choice of hardware or software implementation of bandwidth provisioning or filter or compute engine, type of streaming media data, choice of hardware or software implementation of the "on-demand" embodiment, computing environment, or specific hardware associated with the network interfaces, filter device, or compute engine system.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel, LCD, Plasma, etc.) and/or hardcopy (i.e., printed) formats. The programming of the present invention may be implemented by one skilled in the art of computer systems and/or software design.

It should be understood that any of the features described with respect to one of the embodiments described herein may be similarly applied to any of the other embodiments described herein without departing from the scope of the present invention.

Having thus described the invention, what is claimed is:

1. A computer implemented method comprising:
   recording, by a computing device, an impairment occurring on a live stream;
   replicating the live stream, which includes the impairment, in a derived stream, wherein replicating the live stream includes modifying a source identifier of the live stream, and wherein the source identifier includes at least one of address information and a port number;
   transmitting the derived stream with the modified source identifier to a system under test; and
   evaluating an effect on the system under test subjected to the derived stream, wherein the derived stream includes the impairment.

2. The computer implemented method of claim 1 wherein the live stream includes an initial IP stream clip downloaded from a real time stream source.

3. The computer implemented method of claim 1 wherein the live stream includes an initial IP stream clip selected from an active, live network carrying streaming media flows.

4. The computer implemented method of claim 1 further comprising computing statistics associated with the live stream that include at least a delay factor (DF) parameter defining an instantaneous flow rate balance representing a virtual buffer delay that is needed to prevent data loss and absorb network jitter growth.

5. The computer implemented method of claim 4, wherein the computed statistics further include a media loss rate (MLR) parameter representing a number of media packets that are at least one of lost and corrupted.

6. The computer implemented method of claim 1, wherein the computed statistics further include at least one of stream instantaneous bit-rate, average bit-rate, deviation from nominal bit-rate, minimum and maximum deviation from nominal bit-rate, instantaneous flow rate deviation, and minimum and maximum instantaneous flow rate deviation.

7. A computer implemented method comprising:
   recording, by a computing device, an impairment occurring on a live stream;
   replicating the live stream, which includes the impairment, in a derived stream, wherein replicating the live stream includes modifying a source identifier of the live stream, and wherein the source identifier includes at least one of address information and a port number;
   transmitting the derived stream with the modified source identifier to a system under test;
   evaluating an effect on the system under test subjected to the derived stream, wherein the derived stream includes the impairment;
   tracking information associated with streaming media handled by a network, wherein the streaming media includes the live stream and the derived stream;
   determining that an event associated with the streaming media has occurred; and
   reporting the tracked information associated with the streaming media, wherein the tracked information associated with the streaming media is reported on demand for analysis.

8. The computer implemented method of claim 7, wherein the tracked information includes a set of parameters.

9. The computer implemented method of claim 7, wherein the tracked information includes what traffic the network was handling at a time when the event associated with the streaming media has occurred.

10. The computer implemented method of claim 7, wherein the tracked information includes what traffic the network was handling up to a time when the event associated with the streaming media has occurred.

11. The computer implemented method of claim 7, wherein the tracked information associated with the streaming media is reported at a time when the event associated with the streaming media has occurred.

12. The computer implemented method of claim 7 wherein the tracked information is gathered remotely from a same distribution network as the streaming media.

13. The computer implemented method of claim 7 wherein the tracked information is gathered on a same distribution network as the streaming media.

14. The computer implemented method of claim 7 further comprising allocating bandwidth on demand for the streaming media handled by the network.

* * * * *